United States Patent Office 3,836,665
Patented Sept. 17, 1974

---

3,836,665
DERMATOLOGICAL COMPOSITIONS CONTAINING CERTAIN HIGHER ALKYL ESTERS OF 5-PYRROLIDONE-(2)-CARBOXYLIC ACID
Hans Eberhardt, Biberach an der Riss, and Hans Schaefer, Berlin, Germany, assignors to Boehringer Ingelheim G.m.b.H., Ingelheim am Rhein, Germany
No Drawing. Filed Jan. 12, 1972, Ser. No. 217,290
Claims priority, application Germany, Jan. 18, 1971, P 21 02 172.7
Int. Cl. A61k 27/00
U.S. Cl. 424—274      4 Claims

---

ABSTRACT OF THE DISCLOSURE

Topical dermatological compositions containing from 0.1 to 10% by weight of a higher alkyl ester of 5-pyrrolidone-(2)-carboxylic acid of the formula

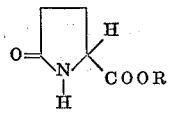

wherein R is straight or branched alkyl of 8–30 carbon atoms.

---

This invention relates to novel topical dermatological compositions containing certain higher alkyl esters of 5-pyrrolidone-(2)-carboxylic acid, as well as to therapeutic and cosmetic methods for the treatment and care of the human skin.

The Prior Art

Published Netherlands application No. 65/04878 [see Chem. Abstr. 64, 9686 (1966)] discloses, inter alia, the octyl and octadecyl esters of 5-pyrrolidone-2-carboxylic acid and their use as starting materials for the preparation of certain polymers and copolymers.

The Invention

We have discovered that higher alkyl esters of 5-pyrrolidone-(2)-carboxylic acid of the formula

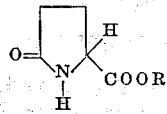
(I)

wherein R is straight or branched alkyl of 8 to 30 carbon atoms, possess therapeutic and cosmetic properties and are therefore useful as active ingredients in topical dermatological compositions for the care and treatment of the human skin.

The compounds embraced by formula I may be prepared by the following methods:

Method A

By esterifying 5-pyrrolidone-(2)-carboxylic acid or a reactive derivative thereof, such as a halide or anhydride, with a higher alkanol of the formula $$HO-R \quad (II)$$

wherein R has the same meanings as in formula I.

The esterification reaction is preferably performed in an inert solvent medium, such as benzene, toluene or chloroform, and in the presence of a strong acid, such as hydrochloric acid or sulfuric acid, or in the presence of an acid-activating agent, such as thionyl chloride or N,N'-dicyclohexyl-carbodiimide, at a temperature up to and including the inert solvent medium. If the alkanol of the formula II is provided in sufficient excess over the amount necessary for esterification of the 5-pyrrolidone-(2)-carboxylic acid, it may also serve as the solvent medium for the reaction.

However, the esterification reaction may also be performed in a vessel provided with a water separator in the presence of an acid, such as sulfuric acid or p-toluenesulfonic acid, or with a reactive derivative of 5-pyrrolidone-(2)-carboxylic acid.

Method B

By intramolecular cyclization of a compound of the formula

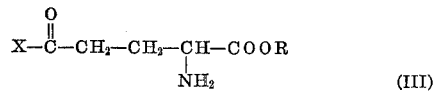
(III)

wherein

R has the same meanings as in formula I, and
X is hydroxyl, halogen or lower alkoxy, at elevated temperatures in the presence of an alkanol of the formula II.

The cyclization reaction is preferably performed in the molten state without a solvent medium or in the presence of a solvent medium, such as an excess of the alkanol of the formula II, and optionally in the presence of an acid, such as hydrogen chloride or sulfuric acid, at elevated temperatures up to 250° C. The reaction may, however, also be performed in the presence of an acid-activating agent, such as thionyl chloride or N,N'-dicyclohexyl-carbodiimide.

The following examples illustrate the preparation of higher alkyl 5-pyrrolidone-(2)-carboxylates of the formula I.

EXAMPLE 1

*5-Pyrrolidone-(2)-carboxylic acid hexadecyl ester by method B*

A mixture consisting of 300 gm. (2 mols) of glutamic and 800 gm. (3.3 mols) of cetyl alcohol was heated to 160° C., and, while maintaining this temperature and stirring, gaseous hydrogen chloride was introduced into the molten mixture for 15 hours. Thereafter, the reaction mixture was allowed to cool, was then dissolved in chloroform, and the resulting solution was filtered. The filtrate was concentrated by evaporation in vacuo, the concentrate was fractionally distilled in a high vacuum, and the fraction passing over between 220 and 230° C. at 0.1 mm. Hg was recrystallized from methanol and petroleum ether, yielding 150 gm. of the compound of the formula

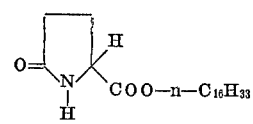

having a melting point of 72–73° C.

EXAMPLE 2

*Hexadecyl 5-pyrrolidone-(2)-carboxylate by method A*

180 ml. of thionyl chloride were added dropwise to a solution of 200 gm. (1.55 mols) of 5-pyrrolidone-(2)-carboxylic acid in 500 ml. of absolute chloroform, and the resulting mixture was stirred for 36 hours at room temperature. Subsequently, 200 ml. of absolute chloroform were added to the reaction mixture, and the precipitated 5-pyrrolidone-(2)-carboxylic acid chloride was collected by vacuum filtration. The filter cake was suspended in 2 liters of a mixture consisting of absolute chloroform and ether (2:1), 380 gm. of cetyl alcohol were slowly added to the suspension, and the resulting mixture was first stirred for three hours at room temperature and then refluxed for two hours. After cooling, the chloroform was evaporated in vacuo, the residue was again taken up in chloroform, the resulting solution was filtered, the chloroform was again evaporated in vacuo, and the residue was fractionally distilled in a high vacuum. The fraction passing over between 224 and 228° C. at 0.08 mm. Hg was recrystallized from methanol and petroleum ether, yielding 246 gm. of hexadecyl 5-pyrrolidone-(2)-carboxylate having a melting point of 72–73° C.

EXAMPLE 3

*Hexadecyl 5-pyrrolidone-(2)-carboxylate by method A*

A mixture consisting of 36 gm. (0.28 mol) of 5-pyrrolidone-(2)-carboxylic acid, 74.2 gm. (0.30 mol) of cetyl alcohol, 250 ml. of toluene and 4.5 ml. of concentrated sulfuric acid was heated at its boiling point for seven hours in a vessel provided with a water separator. Thereafter, the reaction solution was allowed to cool, the toluene was evaporated in vacuo, the residue was taken up in 1 liter of chloroform, and the resulting solution was washed with water until neutral. The chloroform phase was then worked up as described in the preceding example, yielding 30 gm. of hexadecyl 5-pyrrolidone-(2)-carboxylate having a melting point of 73° C.

EXAMPLE 4

Using a procedure analogous to that described in Example 2, *octyl 5-pyrrolidone-(2)-carboxylate*, b.p. 155–158° C. at 0.1 mm. Hg, was prepared from 5-pyrrolidone-(2)-carboxylic acid chloride and 1-octanol.

EXAMPLE 5

Using a procedure analogous to that described in Example 2, *nonyl 5-pyrrolidone-(2)-carboxylate*, b.p. 166–169° C. at 0.2 mm. Hg, was prepared from 5-pyrrolidone-(2)-carboxylic acid chloride and n-nonyl alcohol.

EXAMPLE 6

Using a procedure analogous to that described in Example 2, *decyl 5-pyrrolidone-(2)-carboxylate*, m.p. 48° C., was prepared from 5-pyrrolidone-(2)-carboxylic acid chloride and 1-decanol.

EXAMPLE 7

Using a procedure analogous to that described in Example 2, *undecyl 5-pyrrolidone-(2)-carboxylate*, m.p. 38° C., was prepared from 5-pyrrolidone-(2)-carboxylic acid chloride and n-undecyl alcohol.

EXAMPLE 8

Using a procedure analogous to that described in Example 2, *dodecyl 5-pyrrolidone-(2)-carboxylate*, m.p. 64–66° C., was prepared from 5-pyrrolidone-(2)-carboxylic acid chloride and 1-dodecanol.

EXAMPLE 9

Using a procedure analogous to that described in Example 2, *tridecyl 5-pyrrolidone-(2)-carboxylate*, m.p. 50–51° C., was prepared from 5-pyrrolidone-(2)-carboxylic acid chloride and 1-tridecanol.

EXAMPLE 10

Using a procedure analogous to that described in Example 2, *tetradecyl 5-pyrrolidone-(2)-carboxylate*, m.p. 67° C., was prepared from 5-pyrrolidone-(2)-carboxylic acid chloride and n-tetradecyl alcohol.

EXAMPLE 11

Using a procedure analogous to that described in Example 2, *pentadecyl 5-pyrrolidone-(2)-carboxylate*, m.p. 57–59° C., was prepared from 5-pyrrolidone-(2)-carboxylic acid chloride and n-pentadecyl alcohol.

EXAMPLE 12

Using a procedure analogous to that described in Example 2, 2-hexadecyl 5-pyrrolidone-(2)-carboxylate, m.p. 56–57° C., of the formula

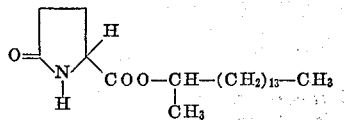

was prepared from 5-pyrrolidone-(2)-carboxylic acid chloride and 2-hexadecanol.

EXAMPLE 13

Using a procedure analogous to that described in Example 2, 3-hexadecyl 5-pyrrolidone-(2)-carboxylate, m.p. 63–64° C., of the formula

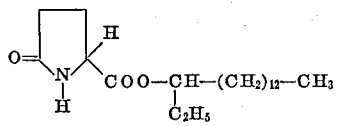

was prepared from 5-pyrrolidone-(2)-carboxylic acid chloride and 3-hexadecanol.

EXAMPLE 14

Using a procedure analogous to that described in Example 2, *heptadecyl 5-pyrrolidone-(2)-carboxylate*, m.p. 62–64° C., was prepared from 5-pyrrolidone-(2)-carboxylic acid chloride and 1-heptadecanol.

EXAMPLE 15

Using a procedure analogous to that described in Example 2, *9-heptadecyl 5-pyrrolidone-(2)-carboxylate*, m.p. 59–60° C., was prepared from 5-pyrrolidone-(2)-carboxylic acid chloride and 9-heptadecanol.

EXAMPLE 16

Using a procedure analogous to that described in Example 2, *octadecyl 5-pyrrolidone-(2)-carboxylate*, m.p. 78° C., was prepared from 5-pyrrolidone-(2)-carboxylic acid chloride and 1-octadecanol.

EXAMPLE 17

Using a procedure analogous to that described in Example 2, *3-octadecyl 5-pyrrolidone-(2)-carboxylate*, m.p. 65–66° C., was prepared from 5-pyrrolidone-(2)-carboxylic acid chloride and 3-octadecanol.

EXAMPLE 18

Using a procedure analogous to that described in Example 2, *nonadecyl 5-pyrrolidone-(2)-carboxylate*, m.p. 67–69° C., was prepared from 5-pyrrolidone-(2)-carboxylic acid chloride and 1-nonadecanol.

EXAMPLE 19

Using a procedure analogous to that described in Example 2, eicosyl 5-pyrrolidone-(2)-carboxylate, m.p. 70–72° C., of the formula

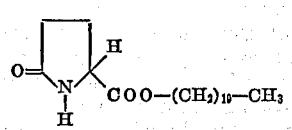

was prepared from 5-pyrrolidone-(2)-carboxylic acid chloride and eicosanol.

EXAMPLE 20

Using a procedure analogous to that described in Example 2, 2-octyl-dodecyl 5-pyrrolidone-(2)-carboxylate, b.p. 214–217° C. at 0.5 mm. Hg, of the formula

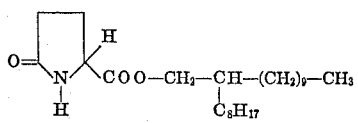

was prepared from 5-pyrrolidone-(2)-carboxylic acid chloride and 2-octyl-1-dodecanol.

EXAMPLE 21

Using a procedure analogous to that described in Example 2, docosyl 5-pyrrolidone-(2)-carboxylate, m.p. 74–75° C., was prepared from 5-pyrrolidone-(2)-carboxylic acid chloride and n-docosanol.

EXAMPLE 22

Using a procedure analogous to that described in Example 2, 2-heptadecyl 5-pyrrolidone-(2)-carboxylate, m.p. 65° C., was prepared from 5-pyrrolidone-(2)-carboxylic acid chloride and 2-heptadecanol.

EXAMPLE 23

Using a procedure analogous to that described in Example 2, tricosyl 5-pyrrolidone-(2)-carboxylate, m.p. 76–78° C., was prepared from 5-pyrrolidone-(2)-carboxylic acid chloride and 1-tricosanol.

The ester had a thin-layer chromatographic $R_f$-value of 0.33 (silicagel plate; system: Benzene/acetone=60/40).

EXAMPLE 24

Using a procedure analogous to that described in Example 2, tetracosyl 5-pyrrolidone-(2)-carboxylate, m.p. 82–83° C., was prepared from 5-pyrrolidone-(2)-carboxylic acid chloride and 1-tetracosanol.

The ester had a thin-layer chromatographic $R_f$-value of 0.35 (silicagel plate; system: Benzene/acetone=60/40).

EXAMPLE 25

Using a procedure analogous to that described in Example 2, hexacosyl 5-pyrrolidone-(2)-carboxylate, m.p. 80–82° C., was prepared from 5-pyrrolidone-(2)-carboxylic acid chloride and 1-hexacosanol.

The ester had a thin-layer chromatographic $R_f$-value of 0.35 (silicagel plate; system: Benzene/acetone=60/40).

As indicated above, we have discovered that the compounds embraced by formula I above possess therapeutic and cosmetic properties which make them useful as active ingredients in conventional topical dermatological compositions, such as ointments, creams, aerosols, powders, tinctures, gels, pastes, essences and lotions intended for the cosmetic care and therapeutic treatment of the human skin. More particularly, the compounds of the formula I exhibit sebaceous gland excretion-inhibiting, antiphlogistic, capillary-stabilizing, skin-softening and skin moisture-increasing activities. Particularly effective are those compounds of the formula I wherein R is alkyl of 16 to 20 carbon atoms.

The sebaceous gland excretion-inhibiting activity was ascertained by the glass block method described by Schaefer and Kuhn-Bussius in Arch. Klin. exper. Derm. 238, 429–435 (1970). Small glass blocks, the facets of which have been roughened or frosted, are pressed against the skin surface where the amount of skin fat is measured. The skin fat or sebum transferred from the skin to the glass facet makes the blocks more translucent, and the increase in translucence is directly proportional to the amount of sebum present on the skin area. The translucence is measured in a photometer. Prior to measurement of the degree of re-fatting of the skin, the skin fat was removed with a plastic foil.

0.25 ml. of an ethanolic 5% solution of the compound to be tested was applied to half of the forehead of 5 to 10 human test subjects, while 0.25 ml. of ethanol was applied to half of the forehead of a group of 5 to 10 control subjects. After 90 minutes the skin fat was removed with the plastic foil, and after three additional hours the degree of re-fatting was determined with the aid of the small glass blocks referred to above. The following results were obtained:

| 5-pyrrolidone-(2)-carboxylate | Average extinction values | | |
|---|---|---|---|
| | Controls | Treated | Difference |
| Pentadecyl | 68.2 | 72.7 | 4.5 |
| Hexadecyl | 64.4 | 82.2 | 17.8 |
| Heptadecyl | 76.1 | 85.0 | 8.9 |
| Octadecyl | 67.2 | 81.5 | 14.3 |
| Nonadecyl | 67.7 | 83.1 | 15.4 |
| Eicosyl | 61.7 | 79.1 | 17.4 |
| Docosyl | 66.1 | 82.0 | 15.9 |

The antiphlogistic activity of the compounds of the present invention was ascertained by the dinitrochlorobenzene-eczema method [see A. I. Scott, Brit. J. Dermatol. 77, 586 (1965)].

The compound to be tested was applied in the form of an ethanolic 5% solution to the shaved flanks of a group of 10 guinea pigs which had been sensitized with dinitrochlorobenzene. An analogous control group was treated with only ethanol. The treatment was effected 30 minutes prior to release of the allergic reaction with a 1‰ solution of dinitrochlorobenzene in acetone. The results were visually evaluated 22 hours thereafter. The following results were obtained.

| 5-Pyrrolidone-(2)-carboxylate | Inhibition of dinitrochlorobenzene-eczema over controls in percent |
|---|---|
| Tetradecyl | 21 |
| Pentadecyl | 21 |
| Hexadecyl | 47 |
| Heptadecyl | 39 |
| Octadecyl | 44 |

The capillary-stabilizing activity of the compounds of the formula I was ascertained by the Evan's Blue method [see J.R. Parrat et al.. J. Physiol. 140, 105 (1958)].

An ethanolic 5% solution of the compound to be tested was applied with an artist's brush to one side of the shaved abdominal skin surface of a group of 6 to 12 adult laboratory rats under pentobarbital sodium anesthesia, and on the other side only ethanol was applied in the same manner. One hour later, the test animals were administered an intravenous injection of Evan's Blue, and five minutes thereafter an inflammation was induced on the treated abdominal skin areas by dropping one drop of an ethanolic 10% perchloroethylene solution thereon. After an interval of 15 minutes a reading of the degree of blue coloration was made on both sides of the abdomen on which two test patches each were made. The following results were obtained:

| 5-Pyrrolidone-(2)-carboxylate | Inhibition of blue coloration in percent |
|---|---|
| Dodecyl | 69 |
| Tetradecyl | 65 |
| Hexadecyl | 75 |
| 9-Heptadecyl | 78 |

The acute intraperitoneal toxicity of the compounds of the formula I was determined in mice by conventional methods. Hexadecyl 5-pyrrolidone-(2)-carboxylate was found to have an $LD_{50}$ of 1950 mgm./kg. i.p., and the other 5-pyrrolidone-(2)-carboxylates were found to have an $LD_{50}$ of greater than 1000 mgm./kg. i.p., although the exact values were not determined.

For cosmetic and/or therapeutic treatment of the human skin the compounds embraced by formula I are incorporated in conventional manner into conventional forms of topical dermatological compositions at a concentration of 0.1 to 10%, preferably 0.5 to 5%, by weight based on the total weight of the composition. Such conventinal forms of topical compositions include ointments, creams, aerosols, powders, tinctures, gels, pastes and lotions intended for use in the care and treatment of the skin, and such compositions may, in addition. contain one or more other active ingredients, such as vitamins, corticosteroids, steroids, antihistamines, keratolytics, antibiotics or disinfectants.

The following examples illustrate a few topical compositions for the cosmetic and/or therapeutic treatment of the skin, which comprise a compound of the formula I. The parts are parts by weight unless otherwise specified.

EXAMPLE 26

Cream

The cream composition is compounded from the following ingredients:

| | Parts |
|---|---|
| Hexadecyl 5-pyrrolidone-(2)-carboxylate | 3.0 |
| Benzalkonium chloride | 0.1 |
| Cremophor O [1] | 4.0 |
| Glycerin monostearate | 4.0 |
| Lanette O [2] | 5.0 |
| Spermaceti | 3.0 |
| Cetiol V [3] | 10.0 |
| Distilled water Q.s. ad 100.0 | |

[1] Long-chain, high-molecular, water-soluble, wax-like polyglycolether; a commercial cosmetic and pharmaceutical emulsifier for high-molecular alcohols, fatty acids, waxes, wool grease, spermaceti, etc.
[2] Mixture of cetyl and stearyl alcohols; a commercial neutral, skin-compatible, consistancy-imparting factor for ointments, creams and emulsions.
[3] Mixture of esters of unsaturated fatty acids, mainly oleyl oleate; a commercial, conventional, skin-penetrating, low-viscosity liquid additive for cosmetic creams and the like.

Preparation

The benzalkonium chloride is dissolved in the distilled water at 70° C. (I). The pyrrolidone-carboxylate is homogeneously suspended in the molten (70° C.) mixture of the Cremophor, the glycerin monostearate, the Lanette, the spermaceti and the Cetiol (II). Suspension II is emulsified at 70° C. into solution I, and the composition is stirred until cool.

EXAMPLE 27

Ointment

The ointment is compounded from the following ingredients:

| | Parts |
|---|---|
| Hexadecyl 5-pyrrolidone-(2)-carboxylate | 3.0 |
| Cremophor O | 6.0 |
| Cremophor A solid [1] | 1.0 |
| Wool grease | 2.0 |
| Paraffin oil | 45.0 |
| Vaseline Q.s. ad 100.0 | |

[1] Non-ionic derivative of fatty substance with polyethyleneoxide radical; a commercial water-dispersible emulsifier for paraffin oil, Vaseline and vegetable oils.

Preparation

The Cremophors, the wool grease, the paraffin oil and the Vaseline are admixed with each other. the mixture is melted by heating to 70° C., the pyrrolidone-carboxylate is suspended in the molten mixture, and the composition is stirred until cool.

EXAMPLE 28

Gel

The gel is compounded from the following ingredients:

| | Parts |
|---|---|
| Hexadecyl 5-pyrrolidone-(2)-carboxylate | 3.0 |
| Carbopol 940 [1] | 0.6 |
| Triethanolamine | 0.6 |
| Cremophor EL [2] | 5.0 |
| Isopropanol | 30.0 |
| Distilled water Q.s. ad 100.0 | |

[1] Carboxypolymethylene; carboxyvinyl polymer with very high molecular weight; form colloidal solutions with water; a commercial thickening agent for cosmetics.
[2] A viscous oil similar in composition to Cremophor O and A; a commercial emulsifier for cosmetics.

Preparation

The pyrrolidone-carboxylate, the Cremophor and the triethanolamine are dissolved in the isopropanol, and the resulting solution is stirred into the solution of the carbopol in the distilled water.

EXAMPLE 29

Bath oil

The composition is compounded from the following ingredients:

| | Parts |
|---|---|
| Hexadecyl 5-pyrrolidone-(2)-carboxylate | 5.0 |
| Texapon N 25 [1] | 30.0 |
| Comperlan OD [2] | 5.0 |
| Isopropanol | 20.0 |
| Ethereal Oil | 2.0 |
| Distilled water Q.s. ad 100.0 | |

[1] Fatty alcohol ether sulfate; a commercial washing, wetting and dispersing agent.
[2] A fatty acid alkylolamide; commercial consistency-imparting factor for cosmetic and pharmaceutical preparations.

Preparation

The pyrrolidone-carboxylate and the ethereal oil are dissolved in the isopropanol, and the resulting solution is stirred into the solution of the Texapon and the Comperlan in the distilled water.

EXAMPLE 30

Hair tonic

The composition is compounded from the following ingredients:

| | Parts |
|---|---|
| Hexadecyl 5-pyrrolidone-(2)-carboxylate | 0.5 |
| Diisopropyl adipate | 0.2 |
| Perfume oil | 0.1 |
| Isopropanol | 50.0 |
| Distilled water Q.s. ad 100.0 | |

Preparation

The pyrrolidone-carboxylate, the isoadipate and the perfume oil are dissolved in the isopropanol, and the resulting solution is admixed with the distilled water by stirring.

EXAMPLE 31

Aerosol dry spray

The spray is compounded from the following ingredients:

| | Parts |
|---|---|
| Hexadecyl 5-pyrrolidone-(2)-carboxylate | 3.0 |
| Span 85 | 0.4 |
| Frigen 11 A | 3.0 |
| Frigen 12/114 (40:60) | 93.6 |

Preparation

The pyrrolidone-carboxylate, the Span and the Frigen 11 are intimately admixed in a ball mill, the mixture is cooled to −15° C., and slowly introduced into the Frigen 12/114 mixture at −40 to −50° C., and the composition is filled into aerosol containers, accompanied by stirring.

EXAMPLE 32

Aerosol foam

The foam composition is compounded from the following ingredients:

| | Parts |
|---|---|
| Hexadecyl 5-pyrrolidone-(2)-carboxylate | 3.0 |
| Cremophor EL | 1.0 |
| Tween 80 | 1.2 |
| Texapon N 25 | 0.8 |
| Ethanol (94%) | 21.0 |
| Distilled water | 57.0 |
| Frigen 12/114 (60:40) | 16.0 |

Preparation

The pyrrolidone-carboxylate is dissolved in the ethanol (solution I). The Cremophor, the Tween and the Texapon are dissolved in the distilled water (solution II). Solution I is stirred into solution II, and the resulting concentrate is filled into aerosol cans. After the valve has been affixed to the filled cans, the propellant gas mixture is introduced under pressure.

EXAMPLE 33

Cream

The composition is compounded from the following ingredients:

| | |
|---|---|
| Hexadecyl 5-pyrrolidone-(2)-carboxylate parts | 3.0 |
| Benzalkon A do | 0.1 |
| Cremophor O do | 4.0 |
| Glycerin monostearate do | 4.0 |
| Lanette O do | 5.0 |
| Spermaceti do | 3.0 |
| Cetiol V do | 10.0 |
| Vitamin A acetate I.U. | 30,000 |
| Vitamin E acetate I.U. | 20 |
| Distilled water Q.s. ad, parts 100.0 | |

The composition is compounded in a manner analogous to that described in Example 26.

EXAMPLE 34

Lotion

The lotion is compounded from the following ingredients:

| | Parts |
|---|---|
| Hexadecyl 5-pyrrolidone-(2)-carboxylate | 3.0 |
| Span 40 | 1.0 |
| Cremophor O | 2.0 |
| Lanette O | 2.0 |
| Spermacetic | 1.0 |
| Cetiol V | 5.0 |
| Paraffin oil, soluble | 1.0 |
| Methylparaben | 0.1 |
| Distilled water Q.s. ad 100.0 | |

Preparation

The Span, the Cremophor, the Lanette, the spermaceti, the Cetoil and the paraffin oil are admixed with each other, the mixture is melted at 70° C., and the pyrrolidone-carboxylate is dissolved in the molten mixture. The distilled water is heated to 80° C., the methylparaben is dissolved therein, the resulting solution is cooled to 70° C. and added to the molten fatty mixture, and the composition is homogenized and stirred until cool.

EXAMPLE 35

Shampoo

The shampoo is compounded from the following ingredients:

| | Parts |
|---|---|
| Hexadecyl 5-pyrrolidone-(2)-carboxylate | 3.0 |
| Texapon N 25 | 48.0 |
| Comperlan O D | 7.0 |
| Methyl cellulose | 1.0 |
| Perfume oil | 0.2 |
| Methylparaben | 0.5 |
| Distilled water Q.s. ad 100.0 | |

Preparation

The distilled water is heated to 80° C., the methylparaben is dissolved therein, and the methyl cellulose is suspended in the aqueous solution. The Zetesol and the perfume oil are admixed with each other, the pyrrolidone-carboxylate is dispersed in the mixture with a high-speed stirrer, the dispersion is added to the methyl cellulose slurry, and the resulting composition is homogenized and purged of air.

EXAMPLE 36

Powder

The powder is compounded from the following ingredients:

| | Parts |
|---|---|
| Hexadecyl 5-pyrrolidone-(2)-carboxylate | 3.0 |
| Colloidal silicic acid | 1.0 |
| Magnesium stearate | 0.2 |
| AMN corn starch Q.s. ad 100.0 | |

Preparation

The pyrrolidone-carboxylate, the colloidal silicic acid and the magnesium stearate are successively added to about one-third of the indicated amount of the corn starch, the mixture is thoroughly blended, the remaining amount of corn starch is added thereto, and the resulting composition is again thoroughly blended.

EXAMPLE 37

Paste

The paste is compounded from the following ingredients:

| | Parts |
|---|---|
| Hexadecyl 5-pyrrolidone-(2)-carboxylate | 3.0 |
| Lanogen 1500 [1] | 20.0 |
| Isopropanol | 45.0 |
| Veegum [2] pharm. | 10.0 |
| Pigment+dye | 1.0 |
| Perfume oil | 0.2 |
| Distilled water Q.s. ad 100.0 | |

[1] A commercial ointment base made from polyethyleneglycol.
[2] Flocculated colloidal magnesium aluminum silicate; a commercial emulsifying, suspending and thickening agent.

Preparation

The pyrrolidone-carboxylate is dissolved in the ointment base at 60° C. (solution I). The perfume oil is dissolved in the isopropanol (solution II). The distilled water is heated to 60° C., the Veegum is dispersed therein and allowed to swell, solutions I and II and the pigment and dye are added thereto, and the composition is thoroughly kneaded and homogenized.

EXAMPLE 38

Tincture

The tincture is compounded from the following ingredients:

| | Parts |
|---|---|
| Hexadecyl 5-pyrrolidone-(2)-carboxylate | 3.0 |
| Isopropanol | 25.0 |
| Ethanol (96%), pure | 25.0 |
| Perfume oil | 0.2 |
| Distilled water Q.s. ad 100.0 | |

Preparation

The isopropanol is admixed with the ethanol, the mixture is heated to 60° C., the pyrrolidone-carboxylate and the perfume oil are dissolved therein, the distilled water is added to the solution, and the resulting aqueous mixture is cooled to room temperature and filtered.

EXAMPLE 39

Gel with antibiotic

The gel is compounded from the following ingredients:

| | Parts |
|---|---|
| Hexadecyl 5-pyrrolidone-(2)-carboxylate | 3.0 |
| Chloramphenicol or tetracycline·HCl | 0.1 |
| Salicylic acid | 0.5 |
| Isopropanol | 25.0 |
| Bentone EW [1] | 2.0 |
| Triethanolamine | 1.8 |
| Distilled water Q.s. ad 100.0 | |

[1] Organic derivatives of hydrous magnesium aluminum silicate minerals; a commercial gelling agent for viscosity and flow control.

Preparation

The Bentone is stirred with a high-speed stirrer into about two-thirds of the required amount of distilled water and allowed to swell therein (I). The salicylic acid and the triethanolamine are dissolved in the remainder of the water (II). The pyrrolidone-carboxylate and the antibiotic is dissolved in the isopropanol (III). II and III are added to I while stirring, and the resulting composition is homogenized and purged of air.

While the above composition examples illustrate only the hexadecyl ester of 5-pyrrolidone-(2)-carboxylic acid as an active ingredient, it should be understood that any of the other compounds embraced by formula I may be substituted therefor in Examples 26 through 39.

Likewise, the amount of active ingredient in these illustrative examples may be varied to achieve the concentration range set forth above, and the amounts and nature of the inert carrier ingredients may be varied to meet particular requirements.

While the present invention has been illustrated with the aid of certain specific embodiments thereof, it will be readily apparent to others skilled in the art that the invention is not limited to these particular embodiments, and that various changes and modifications may be made without departing from the spirit of the invention or the scope of the appended claims.

We claim:

1. A topical dermatological composition for cosmetic sebaceous gland excretion-inhibiting treatment or therapeutic antiphlogistic treatment of the skin, consisting essentially of an inert dermatological carrier and from 0.1 to 10% by weight, based on total weight of the composition, of a compound of the formula

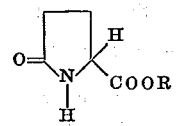

wherein R is straight or branched alkyl of 8 to 30 carbon atoms.

2. The composition of claim 1, wherein R is alkyl of 8 to 26 carbon atoms.

3. The composition of claim 1, wherein said compound is hexadecyl 5-pyrrolidone-(2)-carboxylate.

4. The method of inhibiting the sebaceous gland excretion of the skin of a warm-blooded animal, which comprises topically applying to the skin an effective sebaceous gland excretion-inhibiting amount of a composition of claim 6 wherein R is alkyl of 16 to 20 carbon atoms.

References Cited

UNITED STATES PATENTS 3,235,457  2/1966  Laden _____ 424—274

OTHER REFERENCES

Chemical Abstracts, vol. 64 (1966), 9686–9687.

ALBERT T. MEYERS, Primary Examiner

F. E. WADDELL, Assistant Examiner

U.S. Cl. X.R.

424—45, 46, 47, 365